(12) United States Patent  
Baran et al.

(10) Patent No.: US 12,417,324 B2
(45) Date of Patent: Sep. 16, 2025

(54) WIRING ASSISTANCE SYSTEM

(71) Applicant: Rockwell Automation Technologies, Inc., Mayfield Heights, OH (US)

(72) Inventors: Michael Baran, Milwaukee, WI (US); Benjamin Henderson, Chardon, OH (US); Stuart Scholz, Waukesha, WI (US); Paul Biever, Rice Lake, WI (US); Christopher Mollink, Kitchener (CA); Robert Chrobot, Katowice (PL); Suresh Babu Gulur Narasimha Murthy, Bangalore (IN); Shridhar Hegde, Bangalore (IN); Mohamed Yusuf, Bangalore (IN)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 466 days.

(21) Appl. No.: 17/828,896

(22) Filed: May 31, 2022

(65) Prior Publication Data

US 2023/0111247 A1 Apr. 13, 2023

Related U.S. Application Data

(60) Provisional application No. 63/253,913, filed on Oct. 8, 2021.

(51) Int. Cl.
*G06F 30/18* (2020.01)
*G06T 19/00* (2011.01)
*G06F 113/16* (2020.01)

(52) U.S. Cl.
CPC .......... *G06F 30/18* (2020.01); *G06T 19/006* (2013.01); *G06F 2113/16* (2020.01)

(58) Field of Classification Search
CPC .... G06F 30/18; G06F 2113/16; G06T 19/006; G05B 19/042
See application file for complete search history.

(56) References Cited

U.S. PATENT DOCUMENTS

2017/0132840 A1* 5/2017 Sterzbach .............. H04N 7/183
2021/0357545 A1* 11/2021 Sugawara .............. G06Q 50/04

FOREIGN PATENT DOCUMENTS

WO 2020183835 A1 9/2020

OTHER PUBLICATIONS

Extended European Search Report for Application No. 22199567.3 mailed Jun. 19, 2023, 11 pages.
First Office Action for Chinese Application No. 202211200288.8 mailed Jun. 17, 2025, 17 pages.

* cited by examiner

Primary Examiner — Chong Wu
(74) Attorney, Agent, or Firm — Fletcher Yoder, P.C.

(57) ABSTRACT

A wiring assistance method includes receiving wiring data associated with a set of industrial automation devices and a set of wires and determining a set of wire properties based on the wiring data. The wiring assistance method also includes generating a wiring design based on the set of wire properties. The wiring design includes a set of wire couplings, each wire coupling indicative of a connection between two or more industrial automation devices of the set of industrial automation devices. The wiring assistance method also includes generating, based on the wiring design, a wiring instruction indicative of a first wire coupling of the set of wire couplings for display via an electronic display.

15 Claims, 8 Drawing Sheets

WIRING ASSISTANCE SYSTEM

CROSS REFERENCE TO RELATED APPLICATIONS

This application claims priority from and the benefit of U.S. Provisional Application Ser. No. 63/253,913, entitled "WIRING ASSISTANCE SYSTEM," filed Oct. 8, 2021, which is hereby incorporated by reference in its entirety for all purposes.

BACKGROUND

This disclosure generally relates to systems and methods for wiring connections between devices within industrial automation systems. More particularly, embodiments of the present disclosure are directed toward providing wiring instructions to make connections between devices in the industrial automation systems and validating the connections.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

Industrial automation systems and many different types of equipment in industrial settings may use wires to connect certain devices to each other via terminal blocks, relays, circuit protection devices, and the like. As more devices are included in enclosures that house the devices, the wiring may become increasingly complex. Wiring personnel may thus take great care and time to securely and accurately wire devices to perform their respective operations in the industrial environment. Nevertheless, given the sheer number of wires that may be used by the equipment and the complex routing that the wires may undertake to connect to appropriate devices, errors in wiring devices may occur, thereby delaying the time in which the equipment may be manufactured, commissioned, or the like.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a wiring assistance method includes receiving wiring data associated with a set of industrial automation devices and a set of wires and determining a set of wire properties based on the wiring data. The wiring assistance method also includes generating a wiring design based on the set of wire properties. The wiring design includes a set of wire couplings, each wire coupling indicative of a connection between two or more industrial automation devices of the set of industrial automation devices. The wiring assistance method also includes generating, based on the wiring design, a wiring instruction indicative of a first wire coupling of the set of wire couplings for display via an electronic display.

In another embodiment, a method including receiving, via a processor, an indication representative of a wire and determining, via the processor, a first location and a second location that are to be connected to a first end and a second end of the wire based on wiring data representative of a plurality of wires, a plurality of devices, and at least one connection between at least one of the plurality of wires and at least two of the plurality of devices. The method also includes generating, via the processor, an instruction to connect the wire to the first location and the second location and presenting, via the processor, the instruction via a computing device.

In yet another embodiment, a tangible, non-transitory computer-readable medium includes instructions, that when executed by a processor, cause the processor to perform actions including receiving wiring data associated with a set of industrial automation devices, a set of wires, and a set of wire connections, each wire connection indicative of a connection between at least one industrial automation device of the set of industrial automation devices and at least one wire of the set of wires and determining a set of wire properties based on the wiring data. The instructions also include generating a wiring design based on the set of wire properties, wherein the wiring design comprises a layout of the set of wire connection and an order of the set of wire connections and generating, based on the layout and the order, a wiring instruction indicative of a first wire connection of the set of wire connections.

BRIEF DESCRIPTION OF THE DRAWINGS

These and other features, aspects, and advantages of the present disclosure may become better understood when the following detailed description is read with reference to the accompanying drawings in which like characters represent like parts throughout the drawings, wherein.

DETAILED DESCRIPTION

Figure 1:
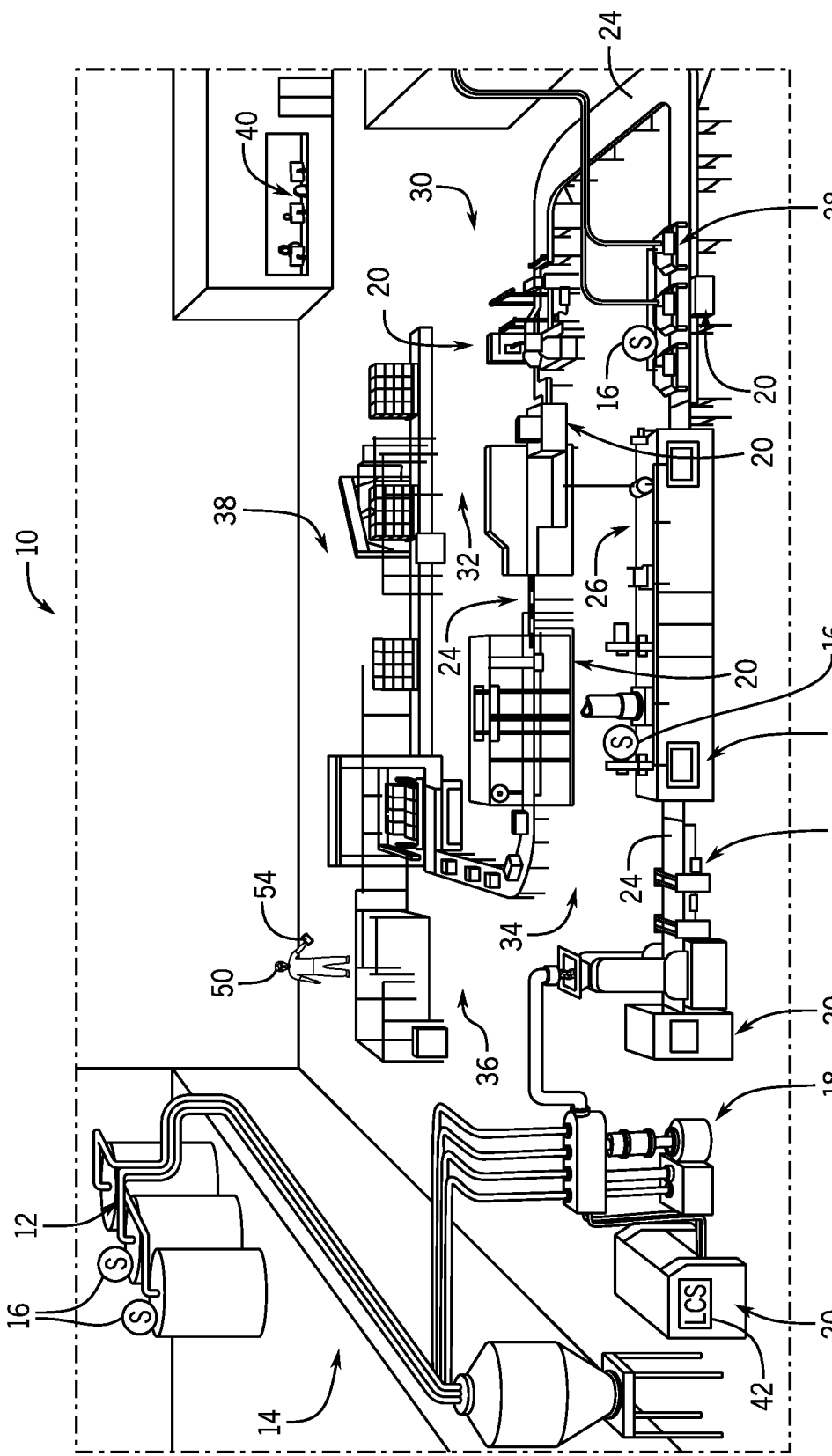
FIG. 1 is a perspective view of an example industrial automation system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is generally directed towards systems and methods that facilitate wiring connections between devices of an industrial automation system. More particularly, embodiments of the present disclosure are directed toward providing wiring instructions to make connections between devices in the industrial automation system and validating the connections.

With the foregoing in mind, a wiring assistance system may assist individuals to ensure that wires are connected to the correct devices based on an existing wiring diagram, wiring table, wiring instructions or the like. That is, in some embodiments, a wiring assistance system may receive wiring data that may be indicative of a wire name, a wire size, a source location, a destination location, a source device, a target device, and other details that may assist an individual to wire devices that may make up industrial equipment. As used herein, wire locations (e.g., source location, destination location) may refer to a particular device, a particular device terminal, and/or any other suitable connection point that couples with a wire. For example, the source location may refer to a wire location that transmits power, data, or a combination thereof to a destination location via a connected wire. Additionally, the destination location may refer to a wire location that receives power, data, or a combination thereof via the connected wire. Additionally or alternatively, the source location and/or the destination location may transmit and receive power, data or a combination thereof via the connected wire. The wiring assistance system may also receive a layout of the devices that may be part of the wiring data. The layout may be provided via two-dimensional drawings, three-dimensional drawings, computer-aided design (CAD) models, and the like. In some embodiments, the CAD model may include a full design of the layout of wiring couplings between devices. Additionally or alternatively, the CAD model may include metadata and/or wiring properties associated with a wiring project, such as wire lengths, wire gauges, wire material properties, wire connection types, and so forth. The CAD model may also include device properties, such as device types, number of device terminals, type of device terminals, communication protocols associated with devices, and so forth. In certain embodiments, the CAD model may include wiring information that identifies signal types associated with the wiring project (e.g., power, data, or a combination thereof). Additionally or alternatively, the CAD model may include information associated with wire coupling tools. In some embodiments, the CAD model may include operating parameters associated with a wire coupling tool for making a wire connection. For example, the operating parameters may include a torque setting for a wire coupling tool. As such, the wiring assistance system may parse the CAD model to collect a list of wires and wire data (e.g., connection, source, target, size) to generate wiring instructions. Based on the layout of the devices and the wiring data, the wiring assistance system may generate the instructions for wiring the equipment, which may include an order in which to wire different devices of the industrial equipment.

The wiring system may then provide instructions via an electronic display to enable an individual to systematically wire the devices presented in a corresponding wiring diagram. In some embodiments, the wiring assistance system may provide audible commands (e.g., voice) to guide the individual in connecting one point of a wire to another point, visual guide to illustrate locations (e.g., terminals, ports) to connect a wire, and the like. The audio instructions may include voice instructions that detail the wiring data, such as source location, a destination location, a wiring size, and the like. As the individual progresses through a wiring project for the industrial equipment, the wiring assistance system may provide a dashboard or summary visualization that indicates a percentage of the entire project that has been completed, an accuracy rate in which the wiring has been performed, a percentage of wiring to be corrected, and the like. As used herein, the wiring project may refer to a set of wire couplings to be made between devices in an industrial automation system.

As the individual completes a connection of a wire, the wiring assistance system may be updated via user input. In some embodiments, the wiring assistance system may test an operation of a device that is connected to the wire to verify that the wiring is correctly implemented. In addition, after the wiring is completed, individuals may often be tasked with confirming that the wiring is accurately placed. As such, probes may be used to determine whether wires are connected to desired target and destination locations based on a resistance between the two points. In some embodiments, when confirming that a particular wire is connected accurately, the wiring assistance system may instruct the user to place one probe on the source location and a second probe on a destination location for the wire, as indicated by the wiring data. If the resistance as measured by a meter connected to the probes is zero, the wires are connected to the correct locations. Alternatively, if the resistance is not zero, the wires may not be connected to the correct locations. In either case, the wiring assistance system may monitor the measurements of the probe as the user is instructed to confirm wire connections and may update a visualization to indicate a progress for the project, an assessment of accuracy in the wiring, and the like.

In some embodiments, the probe may have a communication component that enables it to communicate with the wiring assistance system. The probe may be communicative coupled with the wiring assistance system (e.g., an operator device), such as any suitable wired (e.g., universal serial bus) and/or wireless connection. The communication component may facilitate any suitable type of communication protocol, such as Bluetooth, WiFi, or the like. Based on the data received from the probe (e.g., multi-meter), the wiring assistance system may track the progress of the user.

In addition, the verification of the wiring, the progress of the wiring, and other wiring data related to the tasks performed by the user may be stored in a database by the wiring assistance system. As such, the wiring assistance system may track the progress and record the state of the wiring as performed.

In some embodiments, the wire may include a barcode or some other machine-readable indicia that may allow users to identify wires used to connect devices. As such, the wiring assistance system may receive the machine-readable indicia and provide a visual or audible indication that specifies the devices or locations that the wire should be connected. After the machine-readable indicia is scanned, the wiring assistance system may update a digital view of a layout or a cabinet that represents the devices connected with the respective wire.

Additionally, the wiring assistance system may receive machine-readable indicia (e.g., QR code, barcode) that represents devices that are connected to a wire. As such, the wiring assistance system may record an instance of each scanned device in a design database (e.g., digital twin), which may be used to update maintenance data, record the products used in the equipment, and the like. In some embodiments, the machine-readable indicia may include a serial number or product number that may be reviewed with OCR technology or the like. In some embodiments, the wiring assistance system may verify that the scanned wire is being connected to the correct device based on the scanned information related to the device.

As the user secures wires to different devices that are part of the equipment, the wiring assistance system may overlay visualizations (e.g., augmented reality) that highlight or specify locations for wiring the devices. That is, wiring cues may be provided with augmented reality as the user scans the wire, the device, and works through the instructions to wire the devices. Terminals that are to be connected to wires may include a visualization that indicates to the user its location as the user views the respective device via a computing device that hosts the wiring assistance system.

The wiring assistance system may track the progress of the user and provide timeline data for the user or others that indicate an expected time until completion. As the user becomes less efficient, the wiring assistance system may send an alert to indicate that the user may extend the timeline. The timeline data may be provided to other computing devices to allow others to plan for respective parts of a project that rely on the completion of the wiring tasks. As such, operators of productivity management may adjust scopes of projects, timelines for overall project completion, and updated cost projections more accurately.

The wiring assistance system may also collect key performance indicators (KPIs) and time stamp progress of various tasks including wiring of certain wires, testing of certain devices, and the like. Other variables, such as the identification of the user the wire type used, the process order employed, and the like, may be monitored by the wiring assistance system. The data collected by the wiring assistance system may be presented via a dashboard visualization to allow the user to track their progress in real time and focus efforts in areas where efficiencies may be better realized. In addition, the wiring assistance system may track quality data of the tasks performed by the user.

In some embodiments, a communication-enabled tool (e.g., drill) may receive electronic instructions that control its respective operations. With this in mind, the wiring assistance system may track wires being secured at terminals of devices, terminal blocks, or the like and send instructions to the communication-enabled tool to provide a sufficient amount of torque on a screw or fastener used to secure the wire in the connection terminal. In addition, the wiring assistance system may record the operations performed by the tool and store the information in the database for future reference and to ensure that the wires are connected to correct locations.

In addition, the data collected by the wiring assistance system may be used to prepare a wiring design for manufacturing of sheet metal. That is, the wiring assistance system may receive wiring data and may determine layout arrangements for devices, wires, and other components in a housing. Using this data, the wiring assistance system may determine punch hole locations or fabrication designs for sheet metals to facilitate the support equipment (e.g., DIN rail) that may secure the devices within the housing.

By employing the wiring assistance system described above, electrical design data (e.g., electrical and mechanical CAD) may be used to generate and display physical wiring information to a technician, who makes the actual wired connections between control devices in a cabinet or product. That is, data from CAD models may be interpreted and displayed on a user interface screen to provide wire connection information that would otherwise be interpreted from drawings of wiring diagrams and cabinet layouts. The information on the display may be arranged to logically provide details about the connection point on one device to the connection point on the other device, the correct wire type, the length, and the like. For example, information may include device instance name, terminal name, wire type (e.g., gauge, color, solid/stranded, etc.), wire instance label, wire length, strip length, termination (e.g., lug, ferrule), and the like.

Additional guidance information may be provided, such as audio guidance reading the name of the device/terminal/wire to the operator, an image of the device and/or its location in the cabinet design, an image of the specific terminal position on the device, each of which may be highlighted or indicated with symbols, etc. Moreover, as each connection is made it can be recorded by the operator as complete to aid in documentation of the work. The same data used to guide wiring may then be used to guide the quality checker (e.g., a separate person), who uses an electrical continuity tester device (e.g., probe, multi-meter) to verify the point-to-point connections are made and may check for correct wire type. Each check operation can also be electronically recorded within the work data. The data from a completed project can be stored for production documentation and quality tracking. The design data can further be used when the cabinet is in service to aid the technician in finding connection points for troubleshooting and maintenance procedures. The cable connections, as well as discrete wiring, can also be guided. Additional details regarding the wiring assistance system summarized above will be provided below with reference to FIGS. 1-9.

By way of introduction, FIG. 1 is a perspective view of an example industrial automation system 10 employed by a food manufacturer. It should be noted that although the example industrial automation system 10 of FIG. 1 is directed at a food manufacturer, the present embodiments described herein may be employed within any suitable industry, such as automotive, mining, hydrocarbon production, manufacturing, and the like. The following brief description of the example industrial automation system 10 employed by the food manufacturer is provided herein to help facilitate a more comprehensive understanding of how the embodiments described herein may be applied to industrial devices to significantly improve the operations of the respective industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. In some embodiments, sensors 16 may be positioned within or around the silos 12, the tanks 14, or other suitable locations within the industrial automation system 10 to measure certain properties, such as temperature, mass, volume, pressure, humidity, and the like.

The raw materials may be provided to a mixer 18, which may mix the raw materials together according to a specified ratio. The mixer 18 and other machines in the industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, sensor, actuator, firewall, network switches (e.g., Ethernet switches, modular-managed, fixed-managed, service-router, industrial, unmanaged, etc.) and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may be used to provide power to the machinery used to perform certain tasks, provide protection to the machinery from electrical surges, prevent injuries from occurring with human operators in the industrial automation system 10, monitor the operations of the respective device, communicate data regarding the respective device to a supervisory control system 40, and the like. In some embodiments, each industrial automation device 20 or a group of industrial automation devices 20 may be controlled using a local control system 42. The local control system 42 may include receive data regarding the operation of the respective industrial automation device 20, other industrial automation devices 20, user inputs, and other suitable inputs to control the operations of the respective industrial automation devices 20.

With the various components that make up the example industrial automation system 10 in mind, it should be noted that the number of wires used to connect the various devices to each other can make manufacturing, assembling, and retrofitting efforts quite challenging for those tasked to do so. Indeed, the limited amount of space available to route wires between various components may cause individuals to repeatedly wire devices using different wire lengths, routes, and the like until all of the components in the equipment are appropriately wired. The present embodiments described herein may enable the individuals to more efficiently wire the components with less time, fewer errors, and less waste.

Figure 2:
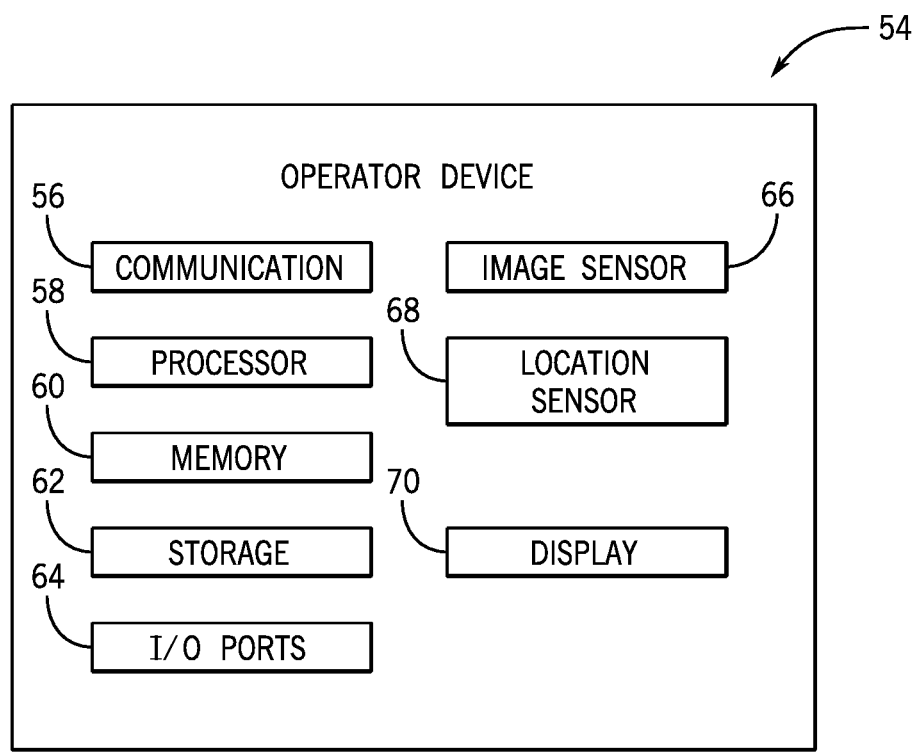
FIG. 2 is a block diagram of an electronic device of the example industrial automation system in FIG. 1, in accordance with an embodiment.

FIG. 2 is a block diagram of an operator device 54 that may be employed in any suitable industrial automation system 10 to generate and/or display wiring instructions. The operator device 54 may include any suitable computing device, such as a personal computer, laptop, tablet, mobile device, wearable device, and so forth. For example, the operator device 54 may include a communication component 56, a processor 58, a memory 60, a storage 62, input/output (110) ports 64, an image sensor 66 (e.g., a camera, a barcode reader, a QR code scanner, and so forth), a location sensor 68, a display 70, additional sensors (e.g., vibration sensors, temperature sensors), and the like. The communication component 56 may be a wireless or wired communication component that may facilitate communication between the industrial automation device 20, cloud-based computing systems, and other communication capable devices.

The processor 58 may be any type of computer processor or microprocessor capable of executing computer-executable code. The processor 58 may also include multiple processors that may perform the operations described below. The memory 60 and the storage 62 may be any suitable articles of manufacture that can server as media to store processor-executable code, data, or the like. These articles of manufacture may represent computer-readable media (e.g., any suitable form of memory or storage) that may store the processor-executable code used by the processor 58 to perform the presently disclosed techniques. Generally, the processor 58 may execute software applications that include programs that enable a user to generate wiring instructions for wiring projects, track and/or monitor wiring projects, and so forth. That is, the software applications may communicate with the operator device 54 and gather information associated with industrial automation devices of the industrial automation system 10, wires for connecting devices, and tools.

The memory 60 and the storage 62 may also be used to store the data, analysis of the data, the software applications, and the like. The memory 60 and the storage 62 may represent non-transitory computer-readable media (e.g., any suitable form of memory or storage) that may store the processor-executable code used by the processor 58 to perform various techniques described herein. It should be noted that non-transitory merely indicates that the media is tangible and not a signal.

In one embodiment, the memory 60 and/or the storage 62 may include a software application that may be executed by the processor 58 and may be used to receiving wiring data and connection data, generate wiring instructions, and display wiring instructions. As used herein, wiring data may refer to information associated with a wiring project and may include a set of wiring properties, as described herein. In some embodiments, the wiring data may include CAD models and the like. As used herein, connection data may refer to information associated with verification of wire couplings, such as with a continuity tester device (e.g., probe, multi-meter). In some embodiments, connection data may include audio data, signal data, a user interface input, and/or any other suitable data that indicates verification and/or completion of a wiring instruction. The software application may enable the operator device 54 to perform various functionalities, such as tracking statistics of a wiring operation, generating performance indicators of a wiring operation, generate timing guidelines of a wiring operation, generating operating parameters for a tool, and so forth.

The I/O ports 64 may be interfaces that couple to other peripheral components such as input devices (e.g., keyboard, mouse), sensors, I/O modules, and the like. The I/O modules may enable the operator device 54 or other operator devices 54 to communicate with tools, the industrial automation device, and/or other devices in the industrial automation system 10 via the I/O modules.

The image sensor 66 may include any image acquisition circuitry such as a digital camera capable of acquiring digital images, digital videos, or the like. The location sensor 68 may include circuitry designed to determine a physical location of the operator device 54. In one embodiment, the location sensor 68 may include a global positioning system (GPS) sensor that acquires GPS coordinates for the operator device 54.

The display 70 may depict visualizations associated with software or executable code being processed by the processor 58. In one embodiment, the display 70 may be a touch display capable of receiving inputs (e.g., selection of a tool for making a wiring connection, selection of wiring data, selection of connection data) from a user of the operator device 54. As such, the display 70 may serve as a user interface to communicate with the tool, the industrial automation device 20, and/or other devices in the industrial automation system 10. The display 70 may be used to display a graphical user interface (GUI) for generating wiring instructions for a wiring task, for tracking a wiring operation including any number of wiring tasks, for displaying a wiring summary for a wiring operation, and the like. The display 70 may be any suitable type of display, such as a liquid crystal display (LCD), plasma display, or an organic light emitting diode (OLED) display, for example. Additionally, in one embodiment, the display 70 may be provided in conjunction with a touch-sensitive mechanism (e.g., a touch screen) that may function as part of a control interface for a tool to control operations of the tool for making a wiring connection. In some embodiments, the user interface may be characterized as a human-machine interface (HMI) or the like.

In some embodiments, the operator device 54 may include a microphone or other audio detection device. For example, the operator device 54 may include a microphone to detect speech from an operator and may generate and transmit audio data corresponding to the detected speech to the processor 58. The processor 58 may process the audio data to determine a command associated with the audio data. For example, the detected speech may include a command to repeat a wiring instruction, move to a subsequent wiring instruction, move to a previous wiring instruction, and so forth. Additionally or alternatively, the detected speech may include an indication that a wiring instruction has been completed and/or verified. The processor 58 may perform an action (e.g., present a corresponding wiring instruction) based on the determined command. In certain embodiments, the operator device 54 may include an antenna to receive signals from other electronic devices. For example, the antenna may receive the signal and may transmit the signal to the processor 58. The processor 58 may determine a command associated with the received signal. For example, a second computing device may generate and transmit a signal that may be received by the operator device 54. The second computing device may generate a signal that indicates completion and/or verification of a wiring instruction, a command to repeat a wiring instruction, move to a subsequent wiring instruction, move to a previous wiring instruction, and the like. The processor 58 may receive the signal and may perform an action (e.g., present a wiring instruction) based on the received signal.

Although the components described above have been discussed with regard to the operator device 54, it should be noted that similar components may make up other computing devices described herein, such as the local control system 42. Further, it should be noted that the listed components are provided as example components and the embodiments described herein are not to be limited to the components described with reference to FIG. 2. For example, other computing or control devices of the industrial automation system 10 may include one or more components that the operator device 54 includes.

Figure 3:
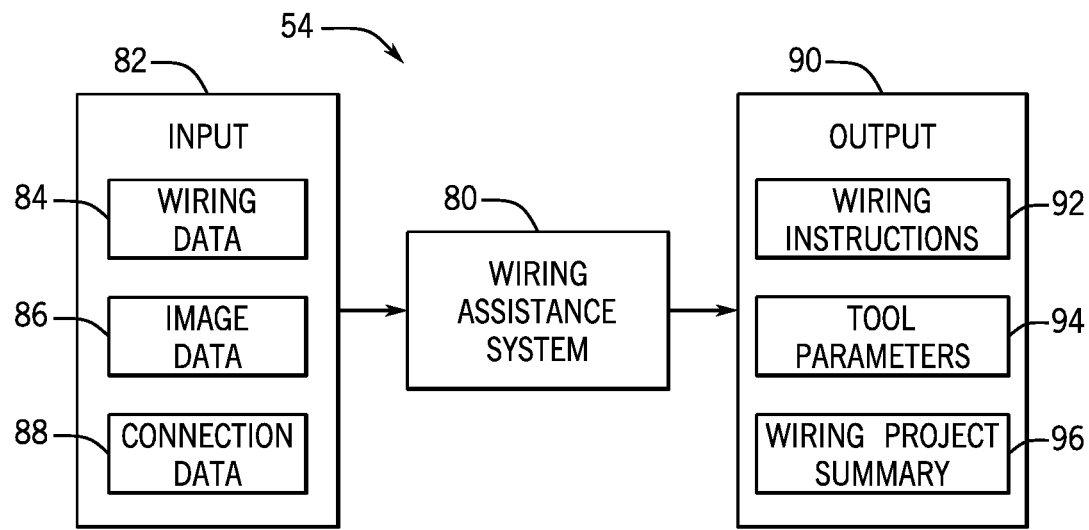
FIG. 3 is a block diagram of a wiring assistance system incorporated into the electronic device of FIG. 2, in accordance with an embodiment.

To elaborate further on the operator device 54, FIG. 3 is a block diagram of the operator device 54 incorporating a wiring assistance system 80. The wiring assistance system 80 may be a software application and may be stored in the memory 60 and/or the storage 62. The wiring assistance system 80 may be executed by the processor 58 and may be utilized to generate wiring instructions. In some embodiments, the wiring assistance system 80 may receive a set of inputs 82, such as wiring data 84, image data 86, and connection data 88, and may generate a set of outputs 90, such as wiring instructions 92, tool operating parameters 94, and a wiring project summary 96. The wiring data 84 may include a wiring diagram for any number of devices of the industrial automation system 10. In certain embodiments, the wiring diagram may include any number of wire couplings between devices of the industrial automation system 10, such as source connections and destination connections for wires, any number of wires to connect to the devices of the industrial automation system 10, and the like. Additionally or alternatively, the wiring assistance system 80 may determine one or more wire properties based on the wiring data 84. For example, the wiring assistance system 80 may determine wire properties, such as a wire type, a wire name, a wire size, a connection type, a source device, a target device, and so forth. The wiring assistance system 80 may generate the wiring instructions 92 based on the wiring data 84 and the wire properties, as described further herein in FIG. 4.

Additionally or alternatively, the wiring assistance system 80 may also generate project timelines and performance indicators for a wiring project. For example, the wiring assistance system 80 may generate the wiring project summary 96 including the project timelines and performance indicators, as described further herein in FIG. 6. The wiring assistance system 80 may also analyze the connection data 88 to identify wiring errors for any number of wire couplings of a wiring design. As used herein, the wiring project summary may refer to a report based on a wiring project. The wiring project summary may include information associated with the wiring project, such as wiring instruction completion times, wiring errors, overall project completion times, met project timelines, failed project timelines, verified wire couplings, and so forth. The wiring project summary 96 may also include the wiring errors, as described further in FIG. 7.

The wiring assistance system 80 may also generate the tool parameters 94 to control operation of a tool for making a wiring connection between devices of the industrial automation system 10. For example, the wiring assistance system 80 may generate and/or may transmit the operating parameters 94 to make the connection by applying a particular amount of torque to a wire connector as described further herein in FIG. 8.

Figure 4:
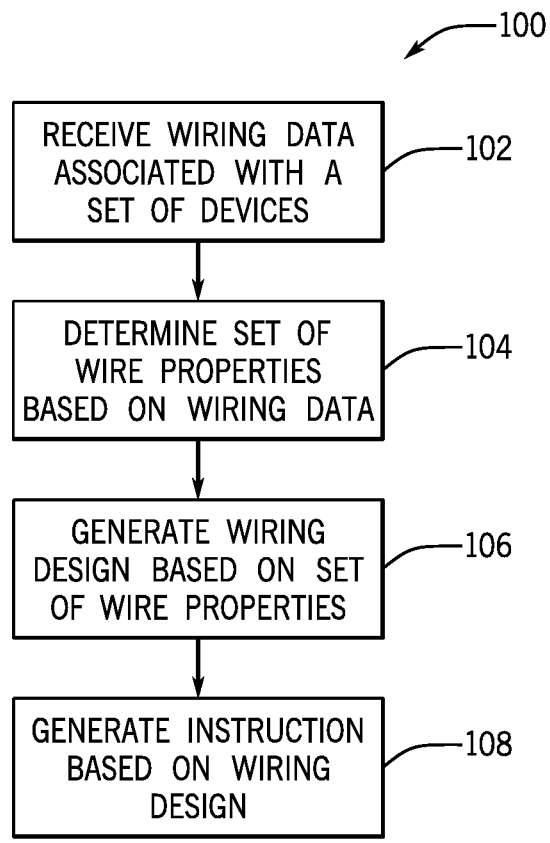
FIG. 4 is a flowchart of a method for operating the wiring assistance system of FIG. 3 to generate wiring instructions, in accordance with an embodiment.

With the foregoing in mind, FIG. 4 illustrates a flowchart of a method 100 for generating wiring instructions, in accordance with an embodiment of the present disclosure. Although the method 100 is described below as performed by the operator device 54 it should be noted that the method 100 may be performed by any suitable computing device and/or processor that generates wiring instructions. Moreover, although the following description of the method 100 is described in a particular order, it should be noted that the method 100 may be performed in any suitable order.

At block 102, the operator device 54 may receive the wiring data 84 associated with a set of devices of the industrial automation system 10. For example, the operator device 54 may receive CAD models including a list of wire couplings between devices of the industrial automation system 10. In some embodiments, the operator device 54 may receive the CAD models by importing the models from a project library. For example, the project library may include any number of wiring projects that have been designed and/or configured by a wiring system designer and may be compatible with specific devices in the industrial automation system 10. The wiring data 84 (e.g., the layout of wire couplings) may include any number of wire names, wire sizes, connection types, source locations, destination locations, source devices, destination devices, and so forth.

Additionally or alternatively, the operator device 54 may receive the image data 86 associated with a wiring project. For example, the operator device 54 may receive an image of a cabinet including any number of devices to be wired in a wiring project. In certain embodiments, the operator device 54 may receive the image data 86 by scanning a barcode, QR code, and/or any other machine-readable indicia associated with a device, a wire, a tool, or any other suitable component of the wiring project. In some embodiments, the image data 86 may include models, such as CAD models, of a wiring project. The operator device 54 may analyze the CAD models to determine devices, wires, connection terminals, and any other suitable wiring components associated with a wiring project. The operator device 54 may convert the wiring data 84 and/or the image data 86 from a first format (e.g., CAD models, images, documents) into a second format (e.g., spreadsheet, comma separated value). The second format may include a list of devices, a list of wires, a list of connection terminals, and so forth associate with the wiring project. In some embodiments, the converted wiring data 84 and/or the converted image data 86 may include a list of wires to be connected in the wiring project. Each wire in the list of wires may include a set of wire properties (e.g., corresponding source location, source device, target location, target device, and any other suitable information) associated with the wire for the wiring project.

At block 104, the operator device 54 may determine a set of wiring properties for each wire based on the received wiring data 84. In some embodiments, the set of wiring properties may include wire names, connection terminals, connection types, devices, available wires, wire sizes, wire types, locations to connect wires, and so forth. The operator device 54 may analyze the received wiring data 84 and/or the image data 86 to determine the set of wiring properties. For example, the operator device 54 may analyze the CAD models to determine wire types, wire names, devices, connection types, terminals, and so forth for a wiring project. In some embodiments, the operator device 54 may retrieve the set of wiring properties from the CAD model. For example, the operator device 54 may identify the set of wiring properties included in metadata of the CAD model. Additionally or alternatively, the operator device 54 may store the set of wiring properties in a database, such as the memory 60 and/or the storage 62.

At block 106, the operator device may generate a wiring design based on the set of wire properties. In certain embodiments, the wiring design may include a layout of the wiring and/or the devices to be connected by the wiring. For example, the wiring design may include positions and/or orientations of any number of devices, positions and/or orientations of any number of connection terminals, positions and/or orientations of any number of wires, and so forth. In some embodiments, the wiring design may include a routing of any number of wires in the wiring project. For example, the routing may include a particular path for a wire to take between a source device and a destination device. Additionally or alternatively, the routing may include any intermediary devices between the source device and the destination device. In certain embodiments, the routing may include any number of attachment points for coupling the wire at a corresponding location within a cabinet, a frame, or any other suitable housing. In some embodiments, the routing may include paths for any number of wires within a cabinet, outside a cabinet, between cabinets, and/or between devices of the industrial automation system 10.

At block 108, the operator device 54 may generate any number of wiring instructions 92 based on the wiring design. Each wiring instruction may include any number of steps for making connections between devices, between a device and a wire, and so forth. For example, a wiring instruction 92 may include steps for making a wire connection between a first wire and a source device, the first wire and a destination device, and so forth. In some embodiments, the wiring instructions 92 may include steps for performing a verification of a wire coupling. For example, a wiring instruction 92 may include steps for utilizing a continuity checker device (e.g., placing a first probe at a source location, a second probe at a second location) to verify a wire coupling. The wiring instructions 92 may include a text instruction, audio instruction, graphical (e.g., image, video) instruction, augmented reality instruction, and so forth displayed via the display 70 of the operator device 54. For example, the wiring instruction 92 may include a prompt that instructs an operator to connect a first wire to a first location (e.g., a source location) associated with a first device (e.g., a source device). Additionally, the operator may progress through a set of wiring instructions 92 for the wiring project. In some embodiments, the operator device 54 may receive an input to progress to a subsequent wiring instruction 92 and/or may receive an input indicative of a selection of a particular wiring instruction 92. For example, after connecting the first wire to the first location, the operator device 54 may receive an input to display another wiring instruction 92. In some embodiments, the operator device 54 may receive an input via a graphical user interface, may receive an input via a microphone of the operator device 54, may receive a signal via a second electronic device communicable coupled to the operator device 54 (e.g., wired and/or wireless connection), and so forth. The operator device 54 may generate and may display the wiring instruction that instructs an operator to connect the first wire to a second location (e.g., a destination location) associated with a second device (e.g., a destination device). Accordingly, the operator may complete the wiring for the first wire based on the wiring instructions 92. Additionally, the operator device 54 may continue to display wiring instructions for additional wires in the wiring project until the wiring project has been completed.

In some embodiments, each wiring instruction 92 may indicate a wire coupling to be made between a source device and a destination device. The wiring instruction 92 may include any number of tasks for making up the wire coupling. For example, the wiring instruction 92 may include selection of a wire for coupling the source device and the destination device, verification of the wire, connection of the wire to a source device, connection of the wire to a destination device, or any combination thereof. In some embodiments, the operator device 54 may generate and display the wiring instruction 92 on the display 70. For example, the display 70 may include a graphical user interface for displaying the wiring instruction 92 and the operator may interact with the graphical user interface to progress through the wiring instructions 92. In some embodiments, the wire coupling may include any number of wiring connections, such as between a first wire and a source device, the first wire and a destination device, and so forth. Additionally or alternatively, the wiring instruction 92 may include a subset of wiring connection instructions associated with any number of wiring connections. For example, the wiring instruction 92 may include a first wiring connection instruction associated with a wiring connection between a first wire and a source device, a second wiring connection instruction associated with a wiring connection between the first wire and the destination device, and so forth.

In certain embodiments, the operator device 54 may verify the wire for coupling the source device and the destination device based on the image data 86. For example, the operator device 54 may display a wiring instruction to prompt the operator to scan a barcode or other machine-readable indicia associated with the wire (e.g., on the wire housing, on wire packaging, and so forth). The machine-readable indicia may be indicative of a wire identifier. For example, each wire associated with the wiring project may have a corresponding wire identifier. The operator device 54 may determine the wire identifier based on the machine-readable indicia and may retrieve a wiring instruction 92 based on the determined wire identifier. For example, each wiring instruction may be associated with any number of wiring identifiers. In some embodiments, the operator device 54 may compare a desired wire identifier and a scanned wire identifier. For example, the operator device 54 may present a wiring instruction including a wire identifier. The operator device 54 may prompt an operator to retrieve the corresponding wire associated with the presented wire identifier. Additionally, the operator device 54 may scan machine-readable indicia on a wire selected by the operator to determine whether the scanned wire identifier matches the desired wire identifier. Based on the comparison, the operator device 54 may provide an indication of the verification of the selected wire. For example, the operator device 54 may generate and/or may update the graphical user interface to display the verification. Accordingly, the operator device 54 may proceed to a subsequent wiring instruction after verification of the selected wire. For example, the operator device 54 may generate a subsequent wiring instruction to couple the selected wire to the source device, the destination device, or both.

Additionally or alternatively, the operator device 54 may retrieve a corresponding wiring instruction 92 associated with a scanned wire. For example, the operator device 54 may determine a wire identifier associated with scanned machine-readable indicia. The operator device 54 may compare the determined wire identifier with any number of stored wire identifiers associated with wiring instructions 92. Based on the comparison, the operator device 54 may determine a correlation (e.g., match) between the determined wire identifier and a stored wire identifier. As such, the operator device 54 may select a wiring instruction 92 corresponding to the stored wire identifier. Accordingly, the operator device 54 may retrieve and/or present the selected wiring instruction 92 based on the stored wire identifier. Additionally or alternatively, the operator device 54 may determine the selected wire is incompatible with the wiring instruction based on the comparison. Accordingly, the operator device 54 may generate a wiring instruction to select a new wire. As such, the wiring assistance system 80 may assist the operator in selecting an appropriate wire for coupling devices in the industrial automation system 10.

Additionally or alternatively, the operator device 54 may determine an order for the wiring instructions 92. For example, the operator device 54 may order the wiring instructions 92 based on a connection priority for the devices in the wiring design. In some embodiments, the wiring data 84 may indicate the connection priority for the devices. In certain embodiments, the operator device 54 may receive input from an operator to order and/or re-order the wiring instructions 92. For example, the operator device 54 may include a graphical user interface that receives a touch input and/or may receive an input via a peripheral component (e.g., keyboard, mouse, and so forth). The operator device 54 may order the wiring instructions 92 based on the received input. For example, the graphical user interface may present any number of user interface elements that each correspond to a wiring property and/or device property. For example, the operator device 54 may receive an input indicative of a selection of a particular device in the wiring project. As such, the operator device 54 may filter the wiring instructions 92 according to the selected device and/or present a set of the wiring instructions 92 corresponding to the selected device. The operator device 54 may present any number of wiring instructions 92 associated with the selected device.

Additionally or alternatively, the operator device 54 may receive an input indicative of a selection of a device type, a wire type, a wire length, wire gauge, and so forth. For example, the operator device 54 may receive an input indicative of a selection of a wire gauge. Accordingly, the operator device 54 may filter the wiring instructions 92 according to the selected wire gauge and/or present a set of the wiring instructions 92 corresponding to the selected wire gauge. Additionally or alternatively, the operator device 54 may order and/or re-order the wiring instructions 92 according to an input. In some embodiments, the operator device 54 may receive an input indicative of a selection of a wire property and/or device property for ordering and/or reordering the wiring instructions 92. For example, the operator device 54 may receive an input indicative of ordering the wiring instructions 92 in an ascending order, descending order, and so forth according to a selected wiring property, such as a wire gauge, wire length, and so forth. In some embodiments, the operator device 54 may determine an order for the wiring instructions 92 based on the wiring data 88. For example, the CAD model may include an order for the wiring instructions 92 and the operator device 54 may present the wiring instructions 92 based on the order.

Figure 5:
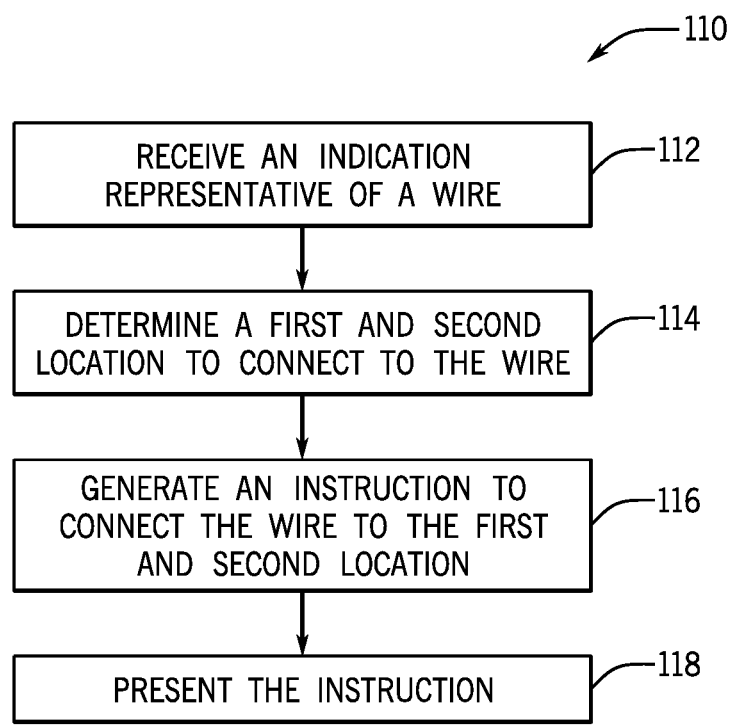
FIG. 5 is a flowchart of a method for operating the wiring assistance system of FIG. 3 to present wiring instructions, in accordance with an embodiment.

With the foregoing in mind, FIG. 5 illustrates a flowchart of a method 110 for presenting wiring instructions, in accordance with an embodiment of the present disclosure. Although the method 110 is described below as performed by the operator device 54 it should be noted that the method 110 may be performed by any suitable computing device and/or processor that generates wiring instructions. Moreover, although the following description of the method 110 is described in a particular order, it should be noted that the method 110 may be performed in any suitable order.

At block 112, the operator device 54 may receive an indication representative of a first wire. For example, the operator device 54 may receive image data in response to scanning a barcode or machine-readable indicia associated with the wire.

At block 114, the operator device 54 may determine a first and a second location to connect to the first wire. The operator device 54 may identify the first location and the second location based on the wiring design. For example, the operator device 54 may analyze the wiring design to determine a source location and a target location associated with the first wire. The operator device 54 may receive wiring data representative of any number of wires, any number of devices, and any number of connections between at least one of the wires and at least two of the devices.

At block 116, the operator device 54 may generate an instruction to connect the wire to the first and the second location. Alternatively, the operator device 54 may generate a set of instructions based on the indication representative of the first wire. For example, the operator device 54 may generate a first instruction representative of coupling the first wire at the first location and a second instruction representative of coupling the first wire at the second location.

At block 118, the operator device 54 may present the instruction. The operator device 54 may present the wiring instruction via the display 70. In certain embodiments, the operator device 54 may also include an audio component, such as a speaker, capable of generating audio wiring instructions.

Figure 6:
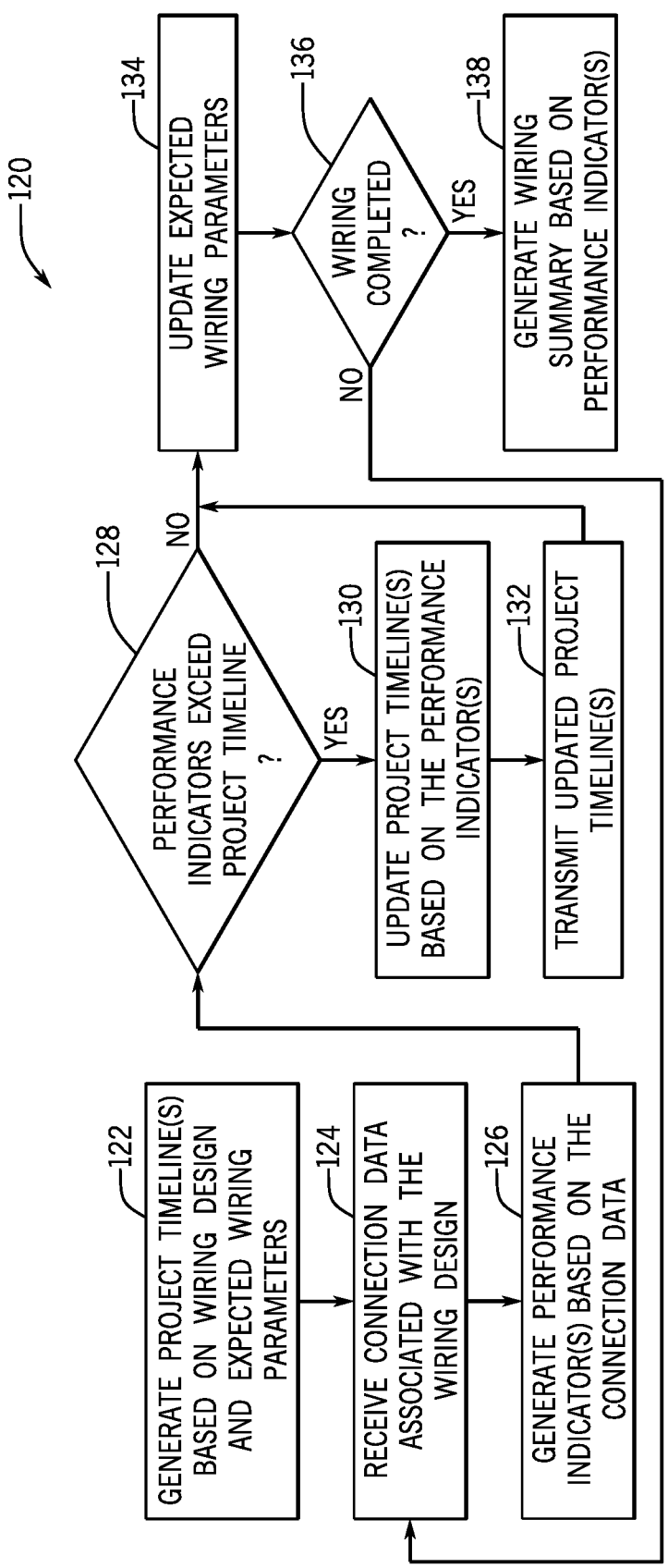
FIG. 6 is a flowchart of a method for operating the wiring assistance system of FIG. 3 to generate wiring project timings, in accordance with an embodiment.

With the foregoing in mind, FIG. 6 illustrates a flowchart of a method 120 for generating project timelines, in accordance with an embodiment of the present disclosure. Although the method 120 is described below as performed by the operator device 54 it should be noted that the method 120 may be performed by any suitable computing device and/or processor that generates wiring instructions. Moreover, although the following description of the method 120 is described in a particular order, it should be noted that the method 120 may be performed in any suitable order.

At block 122, the operator device 54 may generate project timelines based on a wiring design and expected wiring parameters. For example, the project timelines may include an expected overall time to complete a wiring project, expected time(s) to complete a wiring instruction 92, expected time(s) to complete wiring for particular device(s), expected time(s) to complete wiring for a cabinet, expected time(s) to complete wiring for a particular area of an industrial automation system 10, and so forth. The project timelines may be generated based on any number of factors associated with the wiring design and the expected wiring parameters. For example, the wiring design may include the number of devices in the wiring project, the number of wire couplings to be made, the number of wiring connections to be made, distances between the source devices and destination devices, and any other suitable wiring information. The expected wiring parameters may include a skill level (e.g., years of experience) of the operator, an expected wiring completion time for each wire in the wiring project, an expected verification/validation time for each wire in the wiring project, and so forth.

In certain embodiments, the expected times may be determined based on historical data associated with previous wiring projects. For example, the operator device 54 may store and/or retrieve timing information associated with previous wiring projects and may determine the expected times based on the timing information. In some embodiments, the operator device 54 may compare the current wiring design with any number of previous wiring designs to determine the expected times. Additionally or alternatively, the operator device 54 may compare wiring instructions 92 associated with the current wiring design with any number of wiring instructions associated with previous wiring designs. In some embodiments, the operator device 54 may receive the historical data and may determine expected times based on average elapsed times for previous wiring instructions 92.

At block 124, the operator device 54 may receive connection data 88 associated with the wiring design. For example, the operator device 54 may receive connection data 88 from a continuity checker device. In certain embodiments, the continuity checker device may be communicatively coupled to the operator device 54 (e.g., via a wired and/or wireless connection). Additionally or alternatively, the operator device 54 may receive an audio signal from the continuity checker device. In some embodiments, the continuity checker device may present an audible beep during operation. For example, the operator device 54 may generate an instruction to place probes at a source location associated with the source device and/or at a target location associated with the target device. The probes may be connected to a meter (e.g., multimeter, ohmmeter) that may measure a resistance between the probes. If the continuity checker device measures a resistance of zero between the probes, the wires are connected to the correct locations. Accordingly, the continuity checker device may present an audible noise, such as a beep, in response to a zero resistance measurement. The operator device 54 may detect the audible noise via an audio detection component, such as a microphone, and may generate connection data 88 in response to the audio detection. For example, the operator device 54 may determine the continuity checker device has verified the wire coupling based on the detected audio. Accordingly, the operator device 54 may verify and/or may present an indication of the verification on the display 70. Alternatively, if the resistance is not zero, the wires may not be connected to the correct locations. As such, the operator device 54 may generate and/or display a notification corresponding to an error associated with the wire coupling. Additionally or alternatively, the operator device 54 may receive an input indicative of verification of a wire coupling and/or an error associated with the wire coupling. For example, an operator may visually inspect the wire coupling and may provide an input to a user interface of the operator device 54. As such, the operator device 54 may generate and/or display a notification corresponding to the verification or an error associated with the wire coupling.

At block 126, the operator device 54 may generate any number of performance indicators based on the connection data 88. In some embodiments, the operator device 54 may analyze the connection data 88 to determine the performance indicators. For example, the operator device 54 may include a counter to determine an elapsed amount of time for the wiring project, an elapsed amount of time for a wiring instruction, an elapsed amount of time for verification of connection data 88, and any other suitable timing information. Alternatively, the operator device 54 may include separate counters for each elapsed amount of time. The operator device 54 may analyze the elapsed time to determine performance indicators for the wiring project and/or the operator. The operator device 54 may analyze and/or may store the elapsed amount of times associated with any number of wiring instructions. The operator device 54 may begin the counter associated with a wiring instruction. For example, the counter may begin after receiving an input indicative of beginning the wiring instruction 92, may begin concurrently with or after the operator device 54 displays the wiring instruction 92, and so forth. The counter may stop after the wiring instruction 92 is completed by the operator. For example, the counter may stop after receiving an input indicative of completing the wiring instruction 92, may stop after receiving connection data 88 associated with the wiring instruction 92, may stop after verification of the connection data 88, and so forth. As such, the counter may determine the elapsed amount of time for completion of the wiring instruction 92 by the operator.

At block 128, the operator device 54 may determine whether any performance indicators exceed any respective project timelines. In some embodiments, the operator device 54 may compare the expected amounts of times associated with the project timelines with the elapsed amounts of times determined by the counter. For example, the operator device 54 may determine whether any of the elapsed amounts of times associated with a corresponding wiring instruction 92 exceeds respective expected amounts of times associated with the corresponding wiring instruction 92.

In response to exceeding the expected amount of time, at block 128, the operator device 54 may update (block 130) the project timelines based on the performance indicators. For example, the operator device 54 may extend an expected completion time associated with the wiring project. Additionally or alternatively, the operator device 54 may extend expected completion times associated with any number of the wiring instructions 92.

At block 132, the operator device 54 may transmit the updated project timelines to any number of computing devices, such as another operator device, a mobile device, a laptop, a wearable device, and so forth. In some embodiments, the operator device 54 may transmit the updated project timelines to an enterprise resource planning (ERP) product. The ERP product may allow users to start and monitor individual tasks (e.g., wiring instructions) of a wiring project. As such, the ERP product may provide updates to any number of users about the status of the wiring project. In certain embodiments, the operator device 54 may transmit a signal indicative of the updated project timelines. The signal may cause the computing devices to provide a notification of the updated project timelines. For example, the signal may cause the computing devices to display a notification indicative of the wiring project, a current wiring instruction associated with the wiring project, a number of wiring instructions completed, a number of wiring instructions remaining in the wiring project, an estimated time to completion of the wiring project, an elapsed time for the wiring project, an elapsed time for the current wiring instruction, and any other suitable information associated with the wiring project. The operator device 54 may then continue to block 134 to update the expected wiring parameters, as described further below.

In response to falling within the expected time, at block 134, the operator device 54 may update the expected wiring parameters based on the performance indicators. In certain embodiments, the operator device 54 may update the expected wiring parameters based on the calculated elapsed times. For example, the operator device 54 may update any number of subsequent wiring instructions based on completed wiring instructions. In some embodiments, the operator device 54 may group the completed wiring instructions by a wiring property, a device property, or both. The operator device 54 may also determine an average elapsed time associated with the completed wiring instructions. For example, the operator device 54 may analyze and determine an average elapsed time for wiring instructions associated with a first device. The operator device 54 may identify any subsequent wiring instruction are associated with the first device and may update expected times associated with the identified wiring instruction based on the elapsed times. Accordingly, the operator device 54 may update expected wiring parameters for the subsequent wiring instructions based on the elapsed time.

At block 136, the operator device 54 may determine whether the wiring project is complete based on the connection data 88. The operator device 54 may determine whether all the wiring instructions have been displayed, completed, and/or verified for the wiring project. For example, the operator device 54 may communicate with one or more devices associated with the wiring project to verify any wire couplings. Additionally or alternatively, the operator device 54 may receive connection data 88 associated with any number of wire couplings. In certain embodiments, the operator device 54 may receive an acknowledgment from any number of the devices in the industrial automation system 10 that wiring has been completed for the respective device. The operator device 54 may determine whether any wiring instructions remain in the wiring project. Accordingly, the operator device 54 may determine the wiring project is complete when no wiring instructions remain. Additionally or alternatively, the operator device 54 may determine whether all wire couplings have been verified. As such, the operator device 54 may determine the wiring project is complete when all wire couplings have been verified.

In response to determining the wiring project is complete, at block 138, the operator device 54 may generate the wiring project summary 96 based on the connection data 88, the project timelines, and/or the performance indicators. In some embodiments, the operator device 54 may display the wiring project summary 96 on the display 70. The wiring project summary 96 may include a target completion time associated with the wiring project, a target completion time associated with any number of the wiring instructions 92, an actual completion time associated with the wiring project, an actual completion time associated with any number of the wiring instructions 92, timing difference(s) between the target completion time(s) and respective actual completion time(s), an overall score for the wiring project based on the timing difference(s), and any other suitable completion information.

Additionally or alternatively, the wiring project summary 96 may group the completion times based on an associated target device, an associated destination device, a wire type, a communication protocol, a wire length, and/or any other suitable wire property. Accordingly, the wiring project summary 96 may also determine average completion times for any suitable wire property, any selected device, and so forth. In certain embodiments, the operator device 54 may calculate respective scoring grades for any wire property. As such, the wiring project summary 96 may display and provide information regarding efficiency associated with different wiring properties of the wiring project. The wiring project summary 96 may also include wiring information associated with updates to the project timelines. For example, the wiring project summary 96 may indicate and/or may highlight wire couplings that exceeded project timelines.

In response to determining the wiring project is not complete, the operator device 54 may return to block 124 to receive additional connection data 88. The operator device 54 may then continue to update expected project timelines for the wiring project and provide updates via the display 70 and/or other computing devices.

After completion of the wiring instructions for making the wire couplings, the operator device 54 may present wiring instructions for validation/verification of the wire couplings. In some embodiments, a continuity checker device may be utilized to verify the wire couplings and the operator device 54 may receive connection data 88 from the continuity checker device. As described herein, the continuity checker device may present an audible signal in response to verification of a wire coupling. The operator device 54 may detect the audible signal and present a notification indicative of the verification of the wire coupling. For example, the operator device 54 may present a wiring instruction to verify a wire coupling. The wiring instruction may prompt an operator to visually inspect the wire coupling and/or couple the continuity checker device to one or more wire locations associated with the wire coupling. For example, the wiring instruction may prompt the operator to couple a first probe at a first terminal of a first device and to couple a second probe at a second terminal of a second device.

Figure 7:
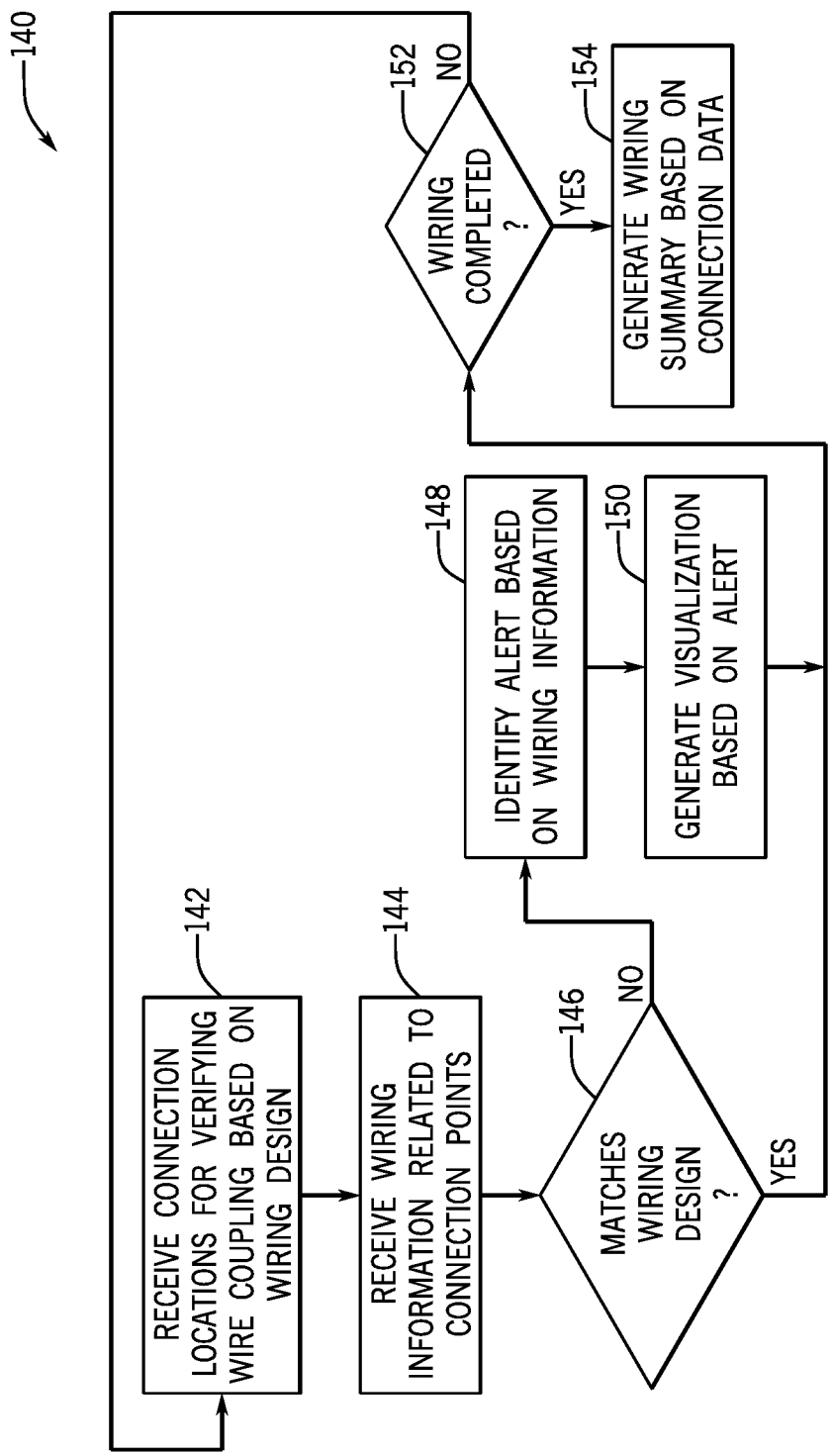
FIG. 7 is a flowchart of a method for operating the wiring assistance system of FIG. 3 to validate wire couplings, in accordance with an embodiment.

With the foregoing in mind, FIG. 7 illustrates a flowchart of a method 140 for validating wiring instructions, in accordance with an embodiment of the present disclosure. Although the method 140 is described below as performed by the operator device 54 it should be noted that the method 140 may be performed by any suitable computing device and/or processor that generates wiring instructions. Moreover, although the following description of the method 140 is described in a particular order, it should be noted that the method 140 may be performed in any suitable order.

At block 142, the operator device 54 may receive connection locations (e.g., source location, destination location) for verifying a wire coupling based on the wiring design In some embodiments, the operator device 54 may generate an instruction to place probes at a source location associated with the source device and/or at a target location associated with the target device. The probes may be connected to a meter (e.g., multimeter, ohmmeter) that may measure a resistance between the probes.

At block 144, For example, the operator device 54 may receive wiring information (e.g., the connection data 88) associated with the wiring design. Additionally or alternatively, the operator device 54 may receive connection data 88 from any number of devices of the industrial automation system 10. For example, a first device may test a wire coupling between the first device and a second device and may send a signal indicative of a valid coupling to the operator device 54. The operator device 54 may identify the coupling between the first device and the second device and may store the signal indicative of the valid coupling. In certain embodiments, the operator device 54 may receive additional connection data 88 associated with any number of devices of the industrial automation system 10. For example, the operator device 54 may receive connection data 88 indicative of a number of connection terminals associated with a device, a number of active connection terminals, a number of inactive connection terminals, a number of available connection terminals, and so forth. The operator device 54 may analyze the connection data 88 based on the wiring design. If the meter measures a resistance of zero between the probes, the wires are connected to the correct locations. Accordingly, the operator device 54 may verify and/or may present an indication of the verification on the display 70. Alternatively, if the resistance is not zero, the wires may not be connected to the correct locations. In some embodiments, the operator device may store the connection data 88 in the memory 60 and/or the storage 62.

At block 146, the operator device 54 may determine whether the connection data 88 matches the wiring design. For example, the operator device 54 may receive connection data 88 from a continuity checker device. In certain embodiments, the continuity checker device may be communicatively coupled to the operator device 54 (e.g., via a wired and/or wireless connection). Additionally or alternatively, the operator device 54 may receive an audio signal from the continuity checker device. In some embodiments, the continuity checker device may present an audible beep during operation. For example, the operator device 54 may generate an instruction to place probes at a source location associated with the source device and/or at a target location associated with the target device. The probes may be connected to a meter (e.g., multimeter, ohmmeter) that may measure a resistance between the probes. If the continuity checker device measures a resistance of zero between the probes, the wires are connected to the correct locations. Accordingly, the continuity checker device may present an audible noise, such as a beep, in response to a zero resistance measurement. The operator device 54 may detect the audible noise via an audio detection component, such as a microphone, and may generate connection data 88 in response to the audio detection. For example, the operator device 54 may determine the continuity checker device has verified the wire coupling based on the detected audio. Accordingly, the operator device 54 may verify and/or may present an indication of the verification on the display 70. Alternatively, if the resistance is not zero, the wires may not be connected to the correct locations. As such, the operator device 54 may generate and/or display a notification corresponding to an error associated with the wire coupling. Additionally or alternatively, the operator device 54 may receive an input indicative of verification of a wire coupling and/or an error associated with the wire coupling. For example, an operator may visually inspect the wire coupling and may provide an input to a user interface of the operator device 54. As such, the operator device 54 may generate and/or display a notification corresponding to the verification or an error associated with the wire coupling. In some embodiments, the operator device 54 may determine an expected number of connected terminals for any number of devices associated with the wiring project. For example, the operator device 54 may determine a first device associated with the wiring design includes three expected connected terminals. The operator device 54 may compare the expected number of connected terminals to an identified number of connected terminals based on the connection data 88. For example, the operator device 54 may determine only two terminals of the first device are currently connected. As such, the operator device 54 may determine the first device is missing one connection.

If any portion of the wiring information does not match the wiring design, the operator device 54 may move to block 148 and the operator device 54 may identify an alert based at least in part on the connection data. As described above, the operator device 54 may receive a resistance measurement from a diagnostic tool (e.g., ohmmeter, multimeter). If the diagnostic tool measures a resistance of zero between the probes, the wires are connected to the correct locations. Accordingly, the operator device 54 may verify and/or may present an indication of the verification on the display 70. Alternatively, if the resistance is not zero, the wires may not be connected to the correct locations. Additionally or alternatively, the operator device 54 may receive the connection data 88 indicative of the wire couplings associated with each device in the wiring project. The operator device 54 may identify any number of wiring errors based on the identified connections.

The operator device 54 may also determine whether a wire is suitably connected to a source location and/or a destination location. For example, the operator device 54 may communicate with a wire coupling tool, such as a tool capable of applying torque to a wire connector. The operator device 54 may communicate with the wire coupling tool and receive connection data from the wire coupling tool. For example, the operator device 54 may receive connection data indicative of a torque applied by the wire coupling tool to make up a wiring connection. In some embodiments, the operator device 54 may compare the applied torque to an expected torque based on the wiring design. The operator device 54 may determine whether the applied torque meets or falls within a threshold value, such as a threshold percentage (e.g., 10%, 5%, 1%, 0.1%, and so forth) and/or a threshold margin (e.g., 1 Newton-meter, 0.5 Newton-meters, 0.1 Newton-meters, and so forth), associated with the expected torque. For example, the operator device 54 may determine the applied torque is 5.05 Newton-meters and the expected torque is 5 Newton-meters. The operator device 54 may determine the applied torque falls within a threshold margin of 0.1 Newton-meters. As such, the operator device 54 may identify wiring errors associated with wires, devices, and/or any other suitable components of the wiring project.

At block 150, the operator device 54 may generate a visualization based on the alert and the wiring information. As such, the operator device 54 may generate and/or display a notification corresponding to the wiring error. Additionally, the operator device 54 may generate and/or display a new wiring instruction or the previous wiring instruction. In certain embodiments, the visualization may be an augmented reality visualization, a virtual reality visualization, a mixed reality visualization, and so forth. For example, the visualization may indicate one or more wires associated with the alert and/or one or more devices (e.g., source device, destination device) associated with the alert. An example of visualizations generated by the operator device is described further in FIG. 9.

At block 152, the operator device 54 may determine whether the wiring project is complete based at least in part on the wiring information. The operator device 54 may determine whether all the wiring instructions have been displayed, completed, and/or verified for the wiring project. For example, the operator device 54 may communicate with one or more devices associated with the wiring project to verify any connections. Additionally or alternatively, the operator device 54 may receive connection data 88 associated with any number of wire couplings. In certain embodiments, the operator device 54 may receive an acknowledgment from any number of the devices in the industrial automation system 10 that wiring has been completed for the respective device. The operator device 54 may determine whether any wiring instructions remain in the wiring project. Accordingly, the operator device 54 may determine the wiring project is complete when no wiring instructions remain. Additionally or alternatively, the operator device 54 may determine whether all wiring connections have been verified. As such, the operator device 54 may determine the wiring project is complete when all wiring connections have been verified.

If wiring project is complete, at block 154, the operator device 54 may generate the wiring project summary 96 based at least in part on the connection data 88. In some embodiments, the operator device 54 may display the wiring project summary 96 on the display 70. The wiring project summary 96 may include any identified wiring errors and/or subsequent wiring instructions to correct the identified wiring errors. In some embodiments, the wiring project summary 96 may include an elapsed time associated with correcting the identified wiring errors. For example, the wiring project summary 96 may include a total elapsed time for correct all identified wiring errors and may also include individual elapsed times for correcting respective identified wiring errors.

Additionally or alternatively, the wiring project summary 96 may group the wiring errors based on an associated target device, an associated destination device, a wire type, a communication protocol, a wire length, and/or any other suitable wire property. The operator device 54 may analyze the wiring errors to determine a number of errors for each device, each wire type, each wire communication protocol, and so forth. In some embodiments, the operator device 54 may identify a wiring error rate based on the number of errors and the total number of wiring connections. For example, a first device may have two wiring errors during a wiring project and ten total wiring connections associated with the wiring project. As such, the operator device 54 may calculate a wiring error rate of 20% associated with the first device, the operator, and the wiring project. In some embodiments, the operator device 54 may identify devices and/or wires with higher wiring error rates. For example, the operator device 54 may identify devices and/or wires that exceed a threshold wiring error rate. In some embodiments, the operator device 54 may receive a set of threshold wiring error rates. For example, the operator device 54 may receive a first threshold wiring error rate associated with devices and a second threshold wiring error rate associated with wires. Additionally or alternatively, the operator device 54 may threshold wiring error rates associated with a particular device, a device type, a wire type, a communication protocol, a connection terminal type, a particular wire coupling tool, and so forth. Accordingly, the wiring project summary 96 may provide an indication of devices, wire types, connection types, and/or any other suitable wire property meeting or exceeding a threshold wiring error rate. As such, the wiring project summary 96 may facilitate identification of problematic wiring components associated with the wiring project.

In response to determining the wiring project is not complete, the operator device 54 may return to block 142 to receive additional connection data 88. The operator device 54 may then continue to analyze connection data to identify wiring errors.

Figure 8:
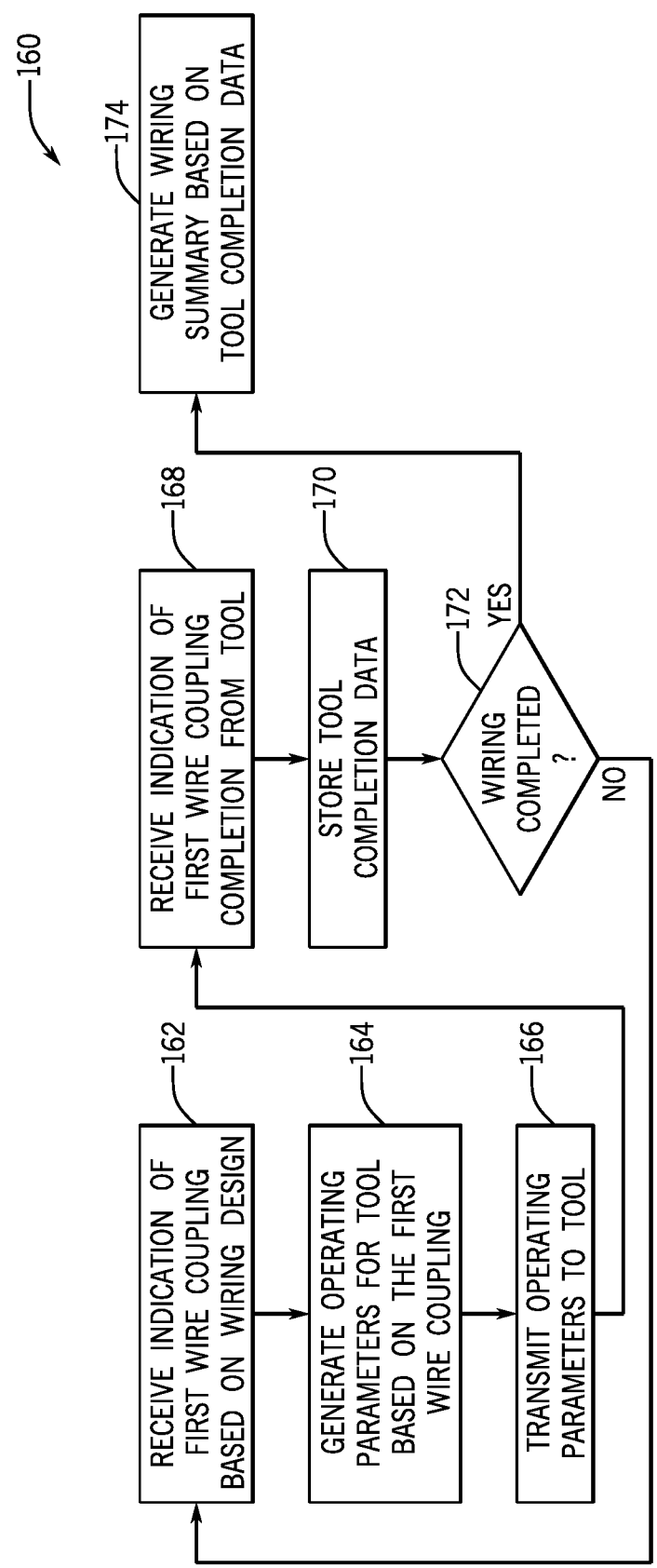
FIG. 8 is a flowchart of a method for operating the wiring assistance system of FIG. 3 to generate tool instructions, in accordance with an embodiment.

With the foregoing in mind, FIG. 8 illustrates a flowchart of a method 160 for generating tool operating parameters, in accordance with an embodiment of the present disclosure. Although the method 160 is described below as performed by the operator device 54 it should be noted that the method 160 may be performed by any suitable computing device and/or processor that generates wiring instructions. Moreover, although the following description of the method 160 is described in a particular order, it should be noted that the method 160 may be performed in any suitable order.

At block 162, the operator device 54 may receive an indication of a first wire coupling based at least in part on the wiring design. In certain embodiments, the operator device 54 may receive the wiring design and may identify a first wire coupling to be completed based on the wiring design. For example, the wiring design may include an order of wire couplings to be completed for the wiring design. Additionally or alternatively, the operator device 54 may receive an indication of the first wire coupling based on connection data. For example, the operator device 54 may receive a signal from a first device indicative of the first wire coupling to a connection terminal associated with the first device. The operator device 54 may also receive device information associated with the first device, such as a number of connection terminals, types of connection terminals, a device type, and so forth.

At block 164, the operator device 54 may generate operating parameters for a tool based at least in part on the first wire coupling. In some embodiments, the operator device 54 may identify a set of properties associated with the first wire coupling based on the wiring design and/or the device information. For example, the operator device 54 may identify the first wire coupling includes a clamp to securely couple the wire to a connection terminal of the first device. Accordingly, the operator device 54 may determine an expected torque amount to apply to the clamp to secure the first wire coupling based on the wiring design. As such, the operator device 54 may generate the operating parameters based on the expected torque amount.

At block 166, the operator device 54 may transmit the operating parameters to the tool. The operating parameters may cause the wire coupling tool to couple a wire associated with the first wire coupling to a first device. Upon receipt of the operating parameters, the wire coupling tool may operate to make up the connection between the wire and the first device. In some embodiments, the operator device 54 may first display a wiring instruction to place the tool at a wiring location. Additionally or alternatively, the operator device 54 may display a wiring instruction to insert the wire and/or a connector into the tool before transmitting the operating parameters.

At block 168, the operator device 54 may receive an indication of completion of the first wire coupling. The wire coupling tool may transmit the indication based on completion of the first wire coupling. For example, the wire coupling tool may transmit the indication in response to meeting or exceeding the expected torque amount. Additionally or alternatively, the operator device 54 may transmit a request to the wire coupling tool and the wire coupling tool may send the indication in response to the request. In certain embodiments, the indication may include tool completion data. For example, the tool completion data may include actual operating parameters associated with the wire coupling tool, such as an actual torque amount, an elapsed time associated with operation of the wire coupling tool, and so forth.

At block 170, the operator device 54 may store tool completion data associated with completion of the first wire coupling. The operator device 54 may receive the tool completion data and may store the tool completion data in the memory 60 and/or the storage 62. In some embodiments, the operator device 54 may analyze the tool completion data. For example, the operator device 54 may identify wiring errors based on the tool completion data. The operator device 54 may compare expected operating parameters and the actual operating parameters associated with the wire coupling tool. In certain embodiments, the operator device 54 may identify a wiring error based on the actual torque amount applied by the wire coupling tool. For example, the wire coupling tool may apply less than the expected torque amount associated with the first wire coupling. As such, the operator device 54 may identify the wiring error and may present the wiring error via the display 70. Additionally or alternatively, the operator device 54 may generate a new wiring instruction and/or may present the previous wiring instruction associated with the first wire coupling to correct the wiring error.

At block 172, the operator device 54 may determine whether the wiring project is complete based at least in part on the wiring design. The operator device 54 may determine whether all the wiring instructions have been displayed, completed, and/or verified for the wiring project. For example, the operator device 54 may communicate with one or more devices associated with the wiring project to verify any connections. Additionally or alternatively, the operator device 54 may receive connection data 88 associated with any number of wire couplings. In certain embodiments, the operator device 54 may receive an acknowledgment from any number of the devices in the industrial automation system 10 that wiring has been completed for the respective device. The operator device 54 may determine whether any wiring instructions remain in the wiring project. Accordingly, the operator device 54 may determine the wiring project is complete when no wiring instructions remain. Additionally or alternatively, the operator device 54 may determine whether all wiring connections have been verified. As such, the operator device 54 may determine the wiring project is complete when all wiring connections have been verified.

If the wiring project is complete, at block 174, the operator device 54 may generate the wiring project summary 96 based at least in part on the tool completion data. In some embodiments, the operator device 54 may display the wiring project summary 96 on the display 70. The wiring project summary 96 may include any generated operating parameters and/or identified wiring errors associated with wire coupling tools. In some embodiments, the wiring project summary 96 may include an elapsed time associated with utilizing the wire coupling tools. For example, the wiring project summary 96 may include a total elapsed time for all wire coupling tools and may also include individual elapsed times for respective wire coupling tools.

Additionally or alternatively, the wiring project summary 96 may group wiring errors based on a corresponding wire coupling tool. The operator device 54 may analyze the wiring errors to determine a number of errors for each wire coupling tool and/or a wire coupling tool type. In some embodiments, the operator device 54 may identify a wiring error rate based on the number of errors and the total number of wiring connections associated with the wire coupling tools. For example, a first wire coupling tool may have three wiring errors during a wiring project and 30 total wiring connections associated with the wiring project. As such, the operator device 54 may calculate a wiring error rate of 10% associated with the first wire coupling tool. In some embodiments, the operator device 54 may identify wire coupling tools with higher wiring error rates. For example, the operator device 54 may identify wire coupling tools that exceed a threshold wiring error rate. Accordingly, the wiring project summary 96 may identify a wire coupling tool as exceeding a threshold wiring error rate associated with wire coupling tools. In some embodiments, the wiring project summary 96 may provide a suggestion to recalibrate or replace the tool. As such, the wiring project summary 96 may facilitate identification of problematic wiring components associated with the wiring project.

In response to determining the wiring project is not complete, the operator device 54 may return to block 162 to receive additional indications of wire couplings. As such, the operator device 54 may continue to provide wiring instruction and/or operating parameters until the wiring project is complete.

Figure 9:
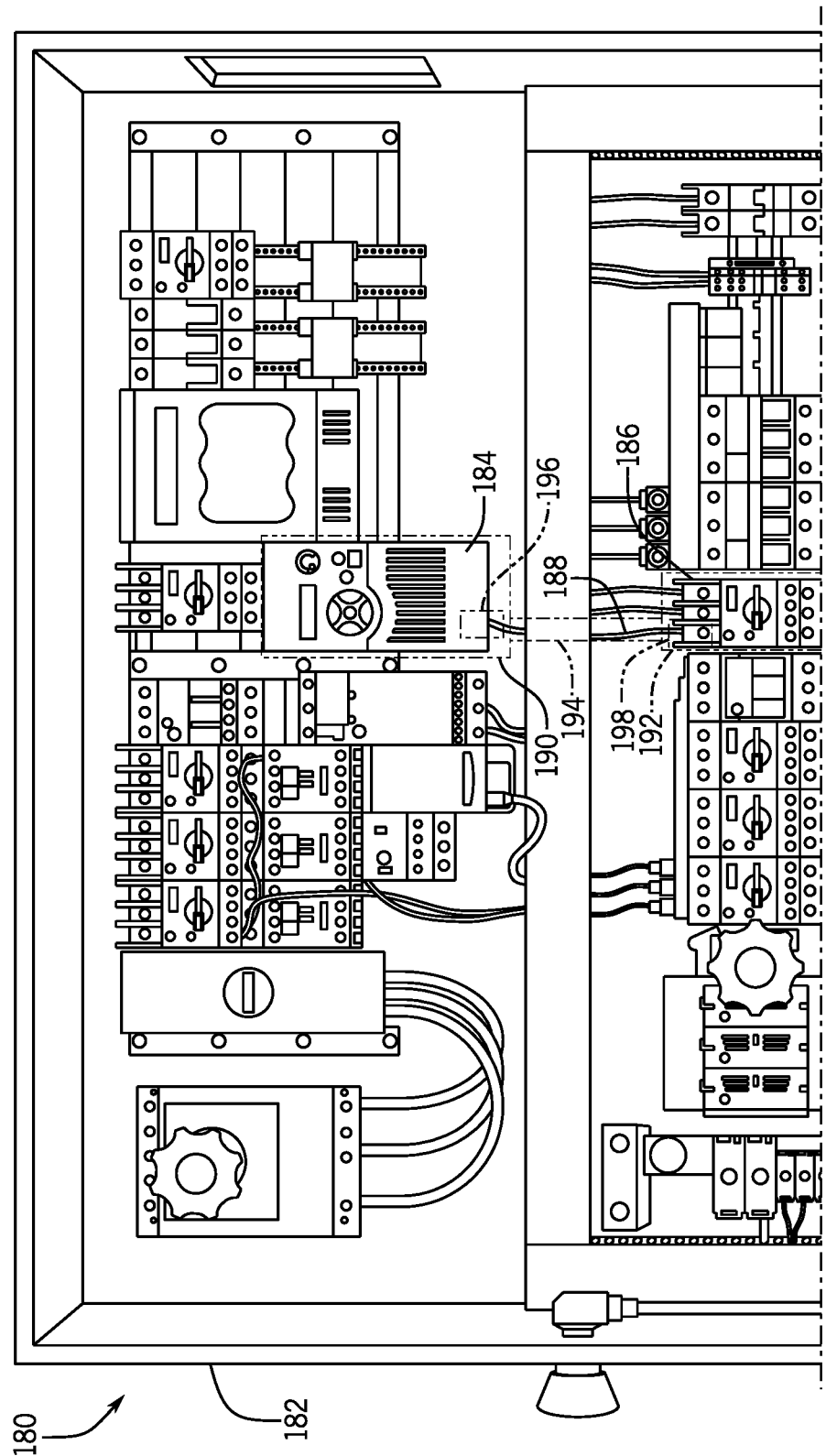
FIG. 9 is an illustration of an example visualization of a workflow presented via the display of the electronic device of FIG. 2, in accordance with an embodiment.

With the foregoing in mind, FIG. 9 illustrates an example visualization 180 of steps of a workflow presented via the display of the electronic device of FIG. 2, in accordance with an embodiment of the present disclosure. The wiring assistance system 80 may include an application used by the operator device 54 to display augmented reality, mixed reality, virtual reality, and any other suitable audiovisual wiring instructions. The visualization 180 may include a graphical user interface depicting an augmented reality wiring instruction being presented on the operator device 54. In some embodiments, the operator may orient the operator device 54 to capture an image or video of a cabinet 182 or desired location to be utilized for generating the augmented reality wiring instruction. Alternatively, the visualization 180 may include a real-time visualization to overlay graphical modifications in the graphical user interface. For example, the visualization 180 may be rendered as an overlaid three-dimensional image over an image data stream (e.g., live feed view of image data) received by the image sensor 66 of the operator device 54.

The cabinet 182 may include any number of industrial automation devices, such as first device 184 and second device 186, and may also include any number of wires, such as wire 188. Each device may include any number of connection terminals capable of coupling to and communicating data, power, and so forth via the wire. In some embodiments, the cabinet 182 and/or any of the devices may be virtual objects generated based on the wiring design and/or the wiring data. For example, the operator device 54 may analyze the wiring data and may determine a model number and/or product type associated with the cabinet 182 and/or any of the devices. The operator device 54 may compare the model numbers and/or product types to one or more industrial automation component libraries to identify a similar or matching virtual object. As such, the operator device 54 may select a similar or matching virtual object to be rendered in the graphical user interface.

The visualization 180 may depict any number of wiring instructions to be completed by an operator during a wiring project. In some embodiments, the wiring instruction may include any number of graphics 190, 192, 194, 196, 198 to facilitate the operator in making up wiring connections. As used herein, graphics may refer to a visual overlay on an augmented reality image, a visual outline associated with a component (e.g., wire, device, terminal, and so forth), and the like. The graphics 190, 192, 194, 196, 198 may include arrows, lines, shadings, colors, and any other visual indicators to assist the operator in identifying components for wiring connections and facilitating correct wiring connections based on the wiring design. Additionally, the graphics 190, 192, 194, 196, 198 may be selectable and/or modifiable via the graphical user interface of the operator device 54. For example, a wiring instruction depicted in the visualization 180 may instruct the operator to make a wiring connection between the first device 184 and the second device 186 via the wire 188. As such, the display 70 may first depict a wiring instruction to assist the operator in identifying the first device 184. Accordingly, the operator device 54 may render a first graphic 190 to outline and identify the first device 184. As shown, the first graphic 190 provides an outline and shading of the first device 184. In some embodiments, the first graphic 190 may be selectable and/or modifiable via the graphical user interface of the operator device 54. For example, the operator device 54 may receive an input indicative of a selection of the first graphic 190. The operator device 54 may provide a list of options for modification of the first graphic 190, such as altering a size, altering a color, altering a shading opaqueness, and any other suitable alteration. Additionally or alternatively, the operator device 54 may receive an input indicative of changing a view of the first graphic 190. For example, the operator device 54 may receive an input indicative of a selection of the first graphic 190 and may zoom in on the first graphic 190. In certain embodiments, the operator device 54 may render only the first graphic 190 in response to receiving an input indicative of selection of the first graphic 190. Additionally or alternatively, the operator device 54 may emphasize (e.g., brighten, alter color) any number of selected graphics and/or deemphasize (e.g., darken, fade) non-selected graphics in the graphical user interface.

Additionally, the operator device 54 may prompt the operator to verify the first device 184 associated with the first graphic 190. The operator device 54 may render a wiring instruction to capture image data associated with the first device 184 (e.g., scan a machine-readable indicia associated with the first device 184, capture image data associated with a model number or product type), such as on the first device 184 and/or on product packaging associated with the first device 184. In some embodiments, the operator device 54 may compare the captured image data and device data associated with the wiring design to verify the first device 184.

The operator device 54 may also render a second graphic 192 to outline and identify the second device 186. The second graphic 192 may differ from the first graphic 190. For example, the second graphic 192 may be a different color, different shading, may include different graphic components, and so forth. The second graphic 192 may assist the operator in identifying the second device 186 associated with the wire coupling. Additionally, the operator device 54 may render a third graphic 194 to outline and identify the wire 188. The third graphic 194 may differ from the first graphic 190 and/or the second graphic 192. In some embodiments, the operator device may render graphics based on a component type (e.g., wire, device), a device type, a wire type, and any other suitable device property and/or wire property.

After identification and/or verification of the first device 184, the second device 186, and the wire 188, the operator device 54 may assist the operator in making up the wire coupling between the first device 184 and the second device 186. The operator device 54 may render a wiring instruction to connect the wire 188 to the first device 184, the second device 186, or both. For example, the operator device 54 may render a fourth graphic 196 associated with a first location (e.g., a source location, a device terminal) for the wire coupling. The operator device 54 may prompt the operator to make up the connection between the wire 188 and the first location. In some embodiments, the first location may include a connection terminal associated with the first device 184. Additionally or alternatively, the operator device 54 may prompt the operator to operate a wire coupling tool to complete and secure the wire connection between the wire 188 and the first location.

Next, the operator device 54 may render a fifth graphic 198 associated with a second location (e.g., a destination location, a device terminal) for the wire coupling. The operator device 54 may prompt the operator to make up the connection between the wire 188 and the second location. In some embodiments, the second location may include a connection terminal associated with the second device 186. Additionally or alternatively, the operator device 54 may generate a wiring instruction to validate and/or verify the wire coupling. For example, the operator device 54 may prompt the operator to place probes at the first location and the second location. The operator device 54 may render the fourth graphic 196 and the fifth graphic 198 to assist the operator in identifying the correct locations for placement of the probes. The operator device 54 may receive connection data via a meter connected to the probes and/or an input via the graphical user interface. Additionally, the operator device 54 may analyze the connection data to validate the wire coupling. While the above description of the operation of the operator device 54 has been presented in a particular order, any suitable order for rendering graphics, identifying components, making wire couplings, and verifying wire couplings may be performed via the operator device 54.

Technical effects of the present disclosure include techniques for facilitating the completion of wiring projects of an industrial automation system by an operator. Wiring instructions may be provided via an operator device that provides audiovisual instructions and/or augmented reality instructions for the operator to reference when performing wiring couplings between industrial automation devices of the industrial automation system. The operator device may render graphics to assist the operator in identifying, coupling, and verifying connections between the industrial automation devices. In some embodiments, the operator device may communicate with wire coupling tools, the industrial automation devices, and any other component to receive data and information associated with the wiring project. The operator device may utilize the data and information to identify wiring errors, update project timelines, generate new wiring instructions, and so forth.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
receiving wiring data associated with a set of industrial automation devices and a set of wires, wherein the wiring data is received via a computer-aided design (CAD) model comprising a wiring diagram indicative of one or more wires of the set of wires for coupling two or more industrial automation devices of the set of industrial automation devices;
determining a set of wire properties based on the wiring data, wherein the set of wire properties comprises:
two or more connection terminals associated with the two or more industrial automation devices;
one or more wire names for the one or more wires;
one or more wire types for the one or more wires; and
one or more wire sizes for the one or more wires;
generating a wiring design based on the set of wire properties, wherein the wiring design comprises:
a set of wire couplings, each wire coupling indicative of a connection between each of the two or more industrial automation devices;
one or more routing paths of the one or more wires within a housing of the set of industrial automation devices; and
one or more attachment points for the one or more wires within the housing; and
presenting, based on the wiring design, a wiring instruction indicative of a first wire coupling of the set of wire couplings for display via an electronic display.

2. The method of claim 1, comprising:
receiving an input via the electronic display; and
in response to receiving the input, presenting a second wiring instruction based on the wiring design, wherein the second wiring instruction is indicative of a second wire coupling of the set of wire couplings.

3. The method of claim 1, comprising:
receiving an input indicative of completion of the first wire coupling; and
presenting a second wiring instruction associated with verification of the first wire coupling.

4. The method of claim 3, comprising:
receiving connection data associated with the first wire coupling; and
based on the connection data indicating an error associated with the first wire coupling, presenting a notification indicative of the error.

5. The method of claim 3, comprising:
receiving connection data associated with the first wire coupling; and
based on the connection data indicating verification of the first wire coupling, presenting a wiring project summary associated with the wiring design.

6. The method of claim 5, wherein the connection data comprises an audio signal associated with a continuity checker device.

7. The method of claim 5, wherein the second wiring instruction comprises a notification to couple a continuity checker device to a first terminal associated with a first industrial automation device and a second terminal associated with a second industrial automation device.

8. The method of claim 1, comprising:
determining a wire identifier associated with a wire for a second wire coupling based on the wiring design;
receiving image data comprising a selected wire identifier associated with a selected wire; and
based on a correlation between the wire identifier and the selected wire identifier, presenting a second wiring instruction indicative of the second wire coupling.

9. The method of claim 1, comprising:
generating a project timeline based on the wiring design;
receiving connection data associated with the set of wire couplings; and
updating the project timeline based on the connection data.

10. The method of claim 1, comprising:
generating one or more tool operating parameters based on the first wire coupling, wherein the one or more tool operating parameters are configured to cause a tool to complete the first wire coupling.

11. A tangible, non-transitory computer-readable medium comprising instructions, that when executed by a processor, are configured to cause the processor to perform actions comprising:
receiving wiring data associated with a set of industrial automation devices, a set of wires, and a set of wire couplings indicative of a connection between two or more industrial automation devices of the set of industrial automation devices, wherein the wiring data is received via a computer-aided design (CAD) model comprising a wiring diagram indicative of one or more wires of the set of wires for coupling the two industrial automation devices;
determining a set of wire properties based on the wiring data, wherein the set of wire properties comprises:
two or more connection terminals associated with the two or more industrial automation devices;
one or more wire names for the one or more wires;
one or more wire types for the one or more wires; and
one or more wire sizes for the one or more wires;
generating a wiring design based on the wiring data, wherein the wiring design comprises:
a layout of the set of wire couplings, the layout indicative of a connection between each of the two or more industrial automation devices;
an order of the set of wire couplings;
one or more routing paths of the one or more wires within a housing of the set of industrial automation devices; and
one or more attachment points for the one or more wires within the housing; and
presenting, based on the layout, the order, the one or more routing paths, and the one or more attachment points, a wiring instruction indicative of a first wire coupling of the set of wire couplings.

12. The tangible, non-transitory computer-readable medium of claim 11, comprising instructions that, when executed by the processor, are configured to cause the processor to perform operations comprising:
receiving, via a wire coupling tool, tool completion data indicative of completion of the first wire coupling;
storing the tool completion data; and
comparing the tool completion data with expected operating parameters associated with the wire coupling tool.

13. The tangible, non-transitory computer-readable medium of claim 12, comprising instructions that, when executed by the processor, are configured to cause the processor to perform operations comprising:
based on the tool completion data meeting or exceeding the expected operating parameters, generating a prompt via an electronic display indicative of verification of the first wire coupling.

14. The tangible, non-transitory computer-readable medium of claim 12, comprising instructions that, when executed by the processor, are configured to cause the processor to perform operations comprising:
based on the tool completion data indicating an error associated with the first wire coupling, presenting a notification comprising the error.

15. The tangible, non-transitory computer-readable medium of claim 12, comprising instructions that, when executed by the processor, are configured to cause the processor to perform operations comprising:
based on the tool completion data indicating an error associated with the first wire coupling, transmitting the tool operating parameters to a second wire coupling tool.

* * * * *